United States Patent [19]

Boerger

[11] 4,009,592
[45] Mar. 1, 1977

[54] MULTIPLE STAGE EXPANSION VALVE FOR AN AUTOMOTIVE AIR CONDITIONING SYSTEM

[75] Inventor: David H. Boerger, Dearborn, Mich.
[73] Assignee: Ford Motor Company, Dearborn, Mich.
[22] Filed: Feb. 9, 1976
[21] Appl. No.: 656,670
[52] U.S. Cl. .................................. 62/222; 62/527; 137/513.3; 138/45
[51] Int. Cl.² ............................ F25B 41/04
[58] Field of Search .......... 62/222, 511, 527, 528; 137/110, 513.3; 138/40, 44, 45, 46

[56] References Cited
UNITED STATES PATENTS

| | | | |
|---|---|---|---|
| 920,716 | 5/1909 | Beckman | 137/513.3 |
| 2,318,962 | 5/1943 | Parker | 137/513.3 |
| 2,450,446 | 10/1948 | Rupp | 137/513.3 X |
| 2,816,572 | 12/1957 | Pratt | 137/513.3 X |
| 2,950,608 | 8/1960 | Abbott | 62/527 X |
| 3,482,415 | 12/1969 | Trask | 62/222 |
| 3,642,030 | 2/1972 | Amick | 138/45 |
| 3,973,410 | 8/1976 | Putnam et al. | 62/527 |

Primary Examiner—Ronald C. Capossela
Attorney, Agent, or Firm—Donald J. Harrington; Keith L. Zerschling

[57] ABSTRACT

A multiple stage expansion valve for use in an air conditioning system for an automotive vehicle including multiple stage flow control orifices located between a refrigerant condenser and a refrigerant evaporator, the high pressure side of the refrigerant gas compressor being in fluid communication with the inlet side of the condenser, the low pressure side of the compressor being connected to the outlet side of the evaporator through a suction throttling valve device, said expansion device comprising multiple stage orifice valves defined in part by a movable piston that responds to the pressure differential across the expansion device to establish optimum refrigerant flow through the air conditioning system during operation at high load, for establishing a relatively high fluid flow restriction during operation at low and moderate loads, and for establishing a moderate fluid flow restriction during operation at high loads and low compressor speeds.

4 Claims, 3 Drawing Figures

MULTIPLE STAGE EXPANSION VALVE FOR AN AUTOMOTIVE AIR CONDITIONING SYSTEM

GENERAL DESCRIPTION OF THE INVENTION

My invention is adapted to be used in automotive air conditioning systems having a refrigerant gas compressor that is driven by the vehicle engine, a condenser and an evaporator. Such systems use a flow restriction or refrigerant expansion device between the condenser and the inlet of the evaporator which changes the refrigerant from a high pressure liquid state to a low pressure liquid-gaseous state. The change in state is accompanied by a temperature drop. The evaporator absorbs heat from the atmospheric air that passes over it, and the refrigerant circulating through the evaporator is returned to the compressor. A suction throttling device is located in the fluid flow path between the evaporator and the compressor to prevent condensate freeze-up on the evaporator fins.

My invention can also be adapted to automotive air conditioning systems which intermittently engage the compressor to prevent evaporator condensate freeze-up. The engagement and disengagement of a thermal switch controlled clutch may be used in such systems to activate and deactivate the compressor.

It is usual practice in systems of the type described in this specification to cause the expansion device to respond to temperature changes at the outlet side of the evaporator and to the pressure in the evaporator to decrease the refrigerant flow when the evaporator load is high with the engine idling. The expansion device responds also to temperature and pressure changes to reduce the effective flow of the refrigerant through the system at low and moderate loads thereby preventing excess flow to the system. Such excess flow during low and moderate load operation would unnecessarily increase the pumping horsepower for the compressor and reduce compressor life. The improved expansion device of my invention is capable of providing a flow control having the characteristics of a more complex thermal expansion device that is sensitive to evaporator pressure and evaporator outlet temperature, but its control functions are achieved by an orifice arrangement with multiple stage flow areas. It also provides assurance that a minimum refrigerant flow will occur under low load conditions when the thermal expansion valve tends to decrease flow so that the required compressor flow is maintained for lubrication purposes.

After the refrigerant passes the evaporator in the cycle, it enters the vapor phase. Partial vaporization occurs in the expansion device. The suction throttling valve located at the inlet side of the compressor causes a reduction in the pressure of the refrigerant at the point so that the evaporator pressure is prevented from falling below a predetermined value below which the evaporator would experience a freeze-up condition.

This action of the suction throttling valve requires an appropriate response by the thermal expansion to decrease the refrigerant flow both under high load engine idling conditions and low load operation at both high and low speeds.

The control function of my invention is achieved by providing flow orifices in series relationship between the condenser and the evaporator inlet. A piston member containing a third flow restricting orifice is disposed between the inlet and outlet orifices of the expansion device and normally is urged under spring pressure into engagement with a valve land on the inlet orifice member. The piston responds to the pressure differential across the expansion device to move the piston out of contact with the inlet orifice member and toward the outlet orifice member. This results in an increased effective flow area through the expansion device. Upon a further increase in the pressure differential across the expansion device the piston seals against the outlet orifice member thereby decreasing the net effect of flow area for the series related orifices. This latter operating condition corresponds to high load, idling operation of the engine.

PARTICULAR DESCRIPTION OF THE INVENTION

Figure 2:
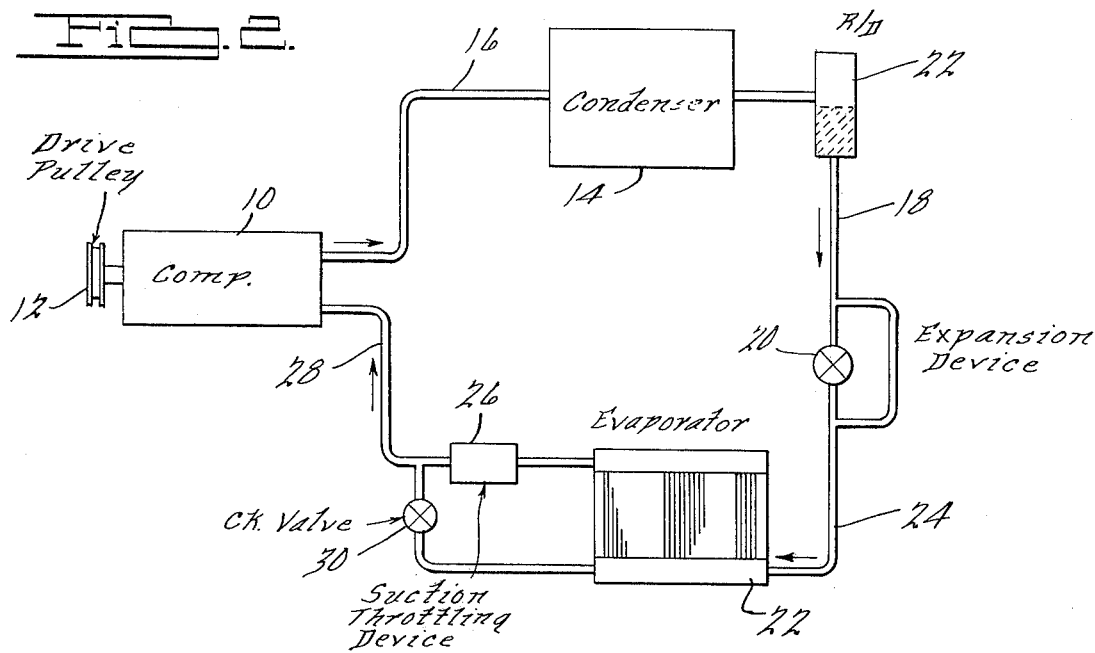
FIG. 2 is a schematic representation of an air conditioning system for an automotive vehicle.

The air conditioning system illustrated schematically in FIG. 2 comprises a compressor 10 driven by a pulley 12 which is connected to the engine crankshaft through a drive belt. A condenser 14 is in fluid communication with the outlet side of the compressor and through refrigerant passage 16. Passage 18 connects the outlet side of the condenser with the inlet side of expansion device 20. A receiver-dryer 22 is located in the passage 18 to separate moisture from the refrigerant. A typical refrigerant pressure in the passage 18 during normal operation of this system would be about 100–250 P.S.I. The expansion device 20 causes the refrigerant to drop in pressure to a value of about 30 to 45 P.S.I., at which time partial vaporization takes place. This is accompanied by a temperature drop.

The outlet side of the expansion device communicates with the inlet side of evaporator 22 through passage 24. The outlet side of evaporator 22 communicates with the inlet side of suction throttling valve 26. The outlet side of the suction throttling valve communicates with the inlet side of compressor 10.

An oil bleed passage extends from the lower collecting region of the evaporator to the downstream side of the suction throttling valve 26 through a pressure loaded one-way check valve 30.

Figure 1:
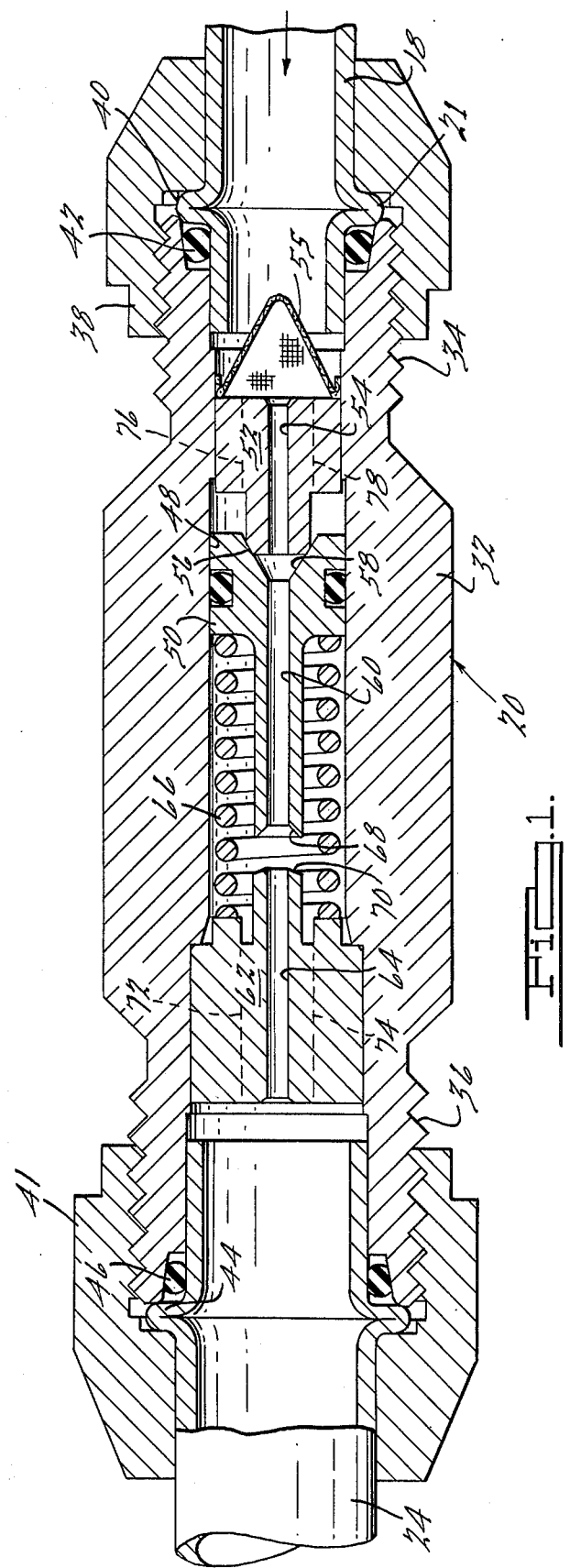
FIG. 1 shows in longitudinal cross sectional form an expansion valve embodying the improvements of my invention.

The expansion valve 20 is shown in more detail in FIG. 1. It includes a housing 32 of generally cylindrical configuration. Its ends are threaded as shown at 34 and 36 to receive fittings 38 and 41, respectively. One end of refrigerant passage 18 is received within the threaded end 34 of the housing 32 and it is flanged at 21 to effect sealing engagement with the end of the housing. The flange 21 is secured fast against the housing end 34 by internal shoulder 40 as the fitting 38 is threaded tight on the end 34. An O-ring seal 42 is received in a pocket formed in the housing end 34. A similar connection is provided between the housing 32 and the refrigerant passage 24. Passage 24 includes a flange 44 which is held fast against the end 36 of the housing 32 by the fitting 41. An O-ring seal 46 surrounds the end of the passage 24 within the housing end 36.

Housing 32 is provided with a central opening 48 under which is positioned slidably a piston 50. The right-hand end of the opening 48 has a slightly reduced diameter which receives orifice member 52 having a centrally disposed refrigerant flow orifice 54. A filter screen 55 is disposed within the right-hand end of the opening 48 on the flow upstream side of the orifice member 52. The left-hand end of the orifice member 52 is provided with an annular valve seat 56 which registers with conical valve land 58 formed on the right-hand end of the piston 50. When the piston 50 engages the seat 56, orifice 54 is in series relationship with respect to central orifice 60 formed in the piston 50. The flow restriction provided by the orifice 60 is less than the flow restriction provided by the orifice 54.

Another orifice member 62 is located at the left-hand end of the opening 48 of the housing 32. It is formed with a central flow restricting orifice 64 arranged in series relationship with respect to the orifices 54 and 60. Both orifice members 52 and 62 are held fast in the positions shown. A compression spring 66, disposed between member 62 and the piston 50, normally urges the piston 50 into engagement with the end of the orifice 52.

When a pressure differential across the expansion device 20 is generated, the piston 52 will be shifted in a left-hand direction against the force of spring 66 until the left-hand end of the piston 50 engages the right-hand end of the orifice member 62. The left end of the piston 50 has a valve seat 68 which is adapted to register with conical valve seat 70 when the piston 50 is shifted in a left-hand direction against the force of spring 66. When the piston 50 is seated against valve seat 70, orifice 64 is in series relationship with respect to central orifice 60 formed in the piston 50. The flow restriction provided by orifice 60 is less than the flow restriction provided by the orifice 64.

When the piston 50 is in the right-hand position, as indicated in FIG. 1, fluid passing from the orifice 60 is free to pass directly to the refrigerant passage 24 through flow passages 72 and 74 as well as through orifice 64. Thus, there is no pressure drop across the orifice 62 when the piston 50 is in its right-hand position. Similarly, fluid may pass directly through the orifice member 52 and through cross-over passages 76 and 78. When the piston is in the position shown in FIG. 1, however, fluid passing from the refrigerant passage 18 is forced to circulate only through the orifice 54 because the end of the orifice member 52 is sealed against the valve seat 58.

Figure 3:
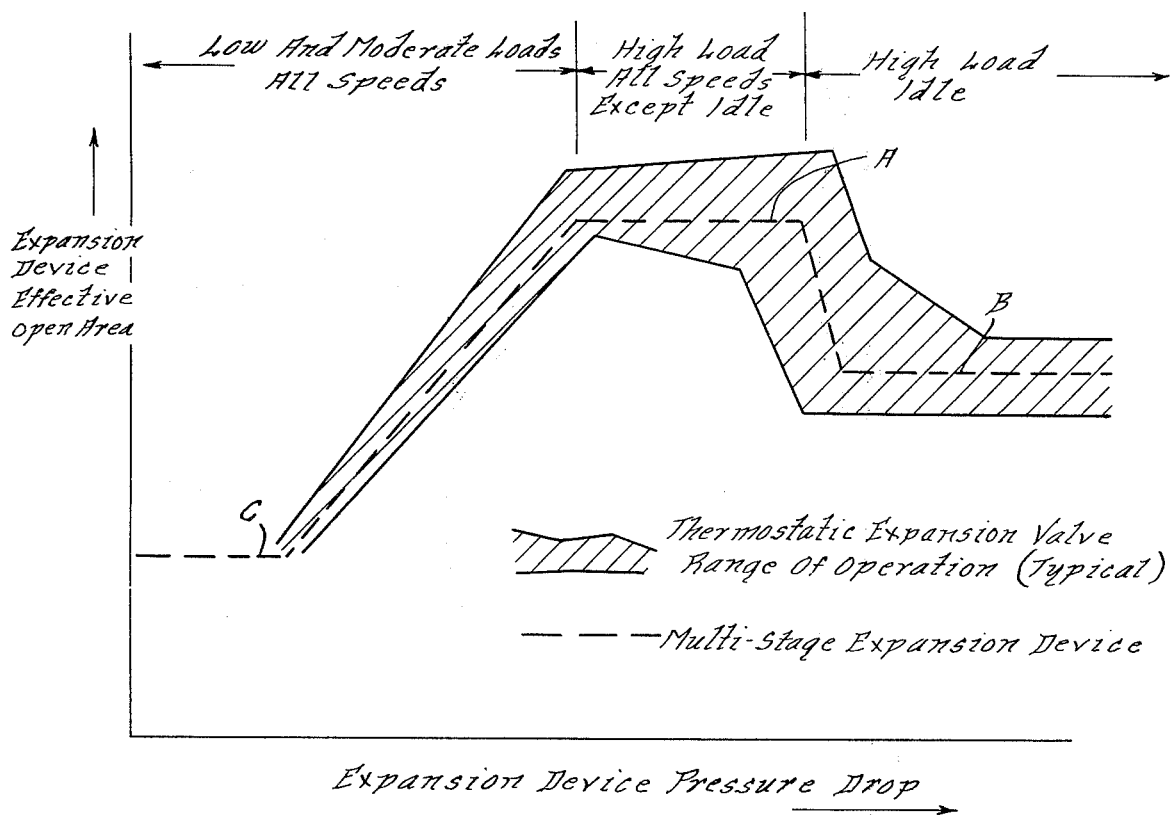
FIG. 3 is a chart showing the operating characteristics of a system that embodies the improved expansion valve of FIG. 1. It shows the relationship between pressure drop across the expansion valve and the effective flow area through the expansion valve for the full range of operating conditions.

The operating characteristics of the expansion device of FIG. 1 are shown in FIG. 3, which includes the relationship between the effective flow area of the orifices and the pressure drop across the expansion device. During high load operation of the system, the pressure differential across the piston 50 is sufficient to cause the piston to move away from the orifice member. If the compressor speed should decrease while the system is operating under high evaporator load, which would be the case during engine idle for example, the pressure drop across the thermal expansion valve is high and the piston 50 will move in a left-hand direction thereby causing the valve surfaces 68 and 70 to engage. This establishes a series relationship between orifices 60 and 64 and flow through through the passages 72 and 74 is interrupted. Thus, the effective flow restriction is increased. This causes a break in the curve of FIG. 3 from an effective area level "A" to an effective area level "B". Flooding of the evaporator during idling conditions thus is avoided. On the other hand, when the system is operating at low and moderate loads, the flow restriction is increased to prevent excessive horsepower loss due to pumping excess refrigerant through the system in excess of that amount that is needed to satisfy the evaporator load. This condition also is shown in FIG. 3. This also assures that the suction throttling valve will be capable of maintaining the refrigerant in the vapor zone in a desired superheat condition thereby preventing liquid from being pumped through the compressor and causing compressor wear.

Under low and moderate load operating conditions the pressure differential across the expansion device will decrease sufficiently to allow the spring 66 to move the piston 50 into the position shown in FIG. 1 thereby interrupting the flow through the passages 76 and 78 and forcing all of the fluid to pass through the orifice 54. This causes the curve to assume the effective area level "C".

The shaded area in FIG. 3 represents the relationship between the pressure drop and the effective area for a conventional thermal expansion device in an air conditioning system which responds to pressure in the evaporator as well as the temperature on the outlet side of the evaporator. By comparing the dotted line in FIG. 3 with the shaded area, the operating characteristics that may be achieved with the device of FIG. 1 may be seen to approximate the operating characteristics achieved with a more complex and costly thermal expansion device with the thermal and pressure sensors.

Having thus described a preferred embodiment of my invention, what I claim and desire to secure by U.S. Letters Patent is:

1. An air conditioning system comprising a compressor, a condenser and an evaporator arranged in a closed series circuit and a refrigerant expansion device situated between the condenser and the inlet side of the evaporator; said expansion device comprising a housing situated in a refrigerant passage between the condenser and the evaporator and adapted to pass refrigerant therethrough, a first orifice member located at the inlet side of said housing, a second orifice member located at the outlet side of said housing, a movable piston situated in said housing intermediate said first and second orifice members, each orifice member having a calibrated refrigerant flow orifice therein, said piston also having a refrigerant flow orifice therein; said piston and said first orifice member having registering portions which, when engaged, establish a continuous flow passage through said piston and said first orifice member whereby the fluid passing through said expansion device follows a flow path through the orifices in said piston and said first orifice member, said first and second orifice members having bypass passages therethrough which bypass their respective orifices, spring means for urging said piston into engagement with said first orifice member; said piston, upon a predetermined pressure drop across said expansion device, shifting against the opposing force of said spring into engagement with said second orifice member whereby the pressure drop across said expansion device is determined by the orifice characteristics of the orifices in said piston and in said second orifice member.

2. The combination set forth in claim 1 wherein the bypass passage for said second orifice member becomes effectively sealed from the refrigerant flow path when said piston is shifted against the force of said spring into engagement with said second orifice member and wherein the bypass passage for the first orifice member is effectively sealed from the refrigerant flow path when said piston engages said first orifice member.

3. The combination set forth in claim 1 wherein the registering portions of said piston and said first orifice member define cooperating valve surfaces which form a varible flow orifice as the piston is shifted against the force of said spring upon an increase in pressure differential across said expansion device whereby a gradual change in effective flow area of said expansion device occurs during initial shifting movement of said piston.

4. The combination set forth in claim 2 wherein the registering portions of said piston and said first orifice member define cooperating valve surfaces which form a variable flow orifice as the piston is shifted against the force of said spring upon an increase in pressure differential across said expansion device whereby a gradual change in effective flow area of said expansion device occurs during initial shifting movement of said piston.

* * * * *